Jan. 5, 1971  S. MOTTA  3,552,001

METHOD FOR MANUFACTURING A BAND BRAKE

Original Filed Feb. 10, 1965  3 Sheets-Sheet 1

SALVATORE MOTTA
INVENTOR

BY

ATTORNEYS

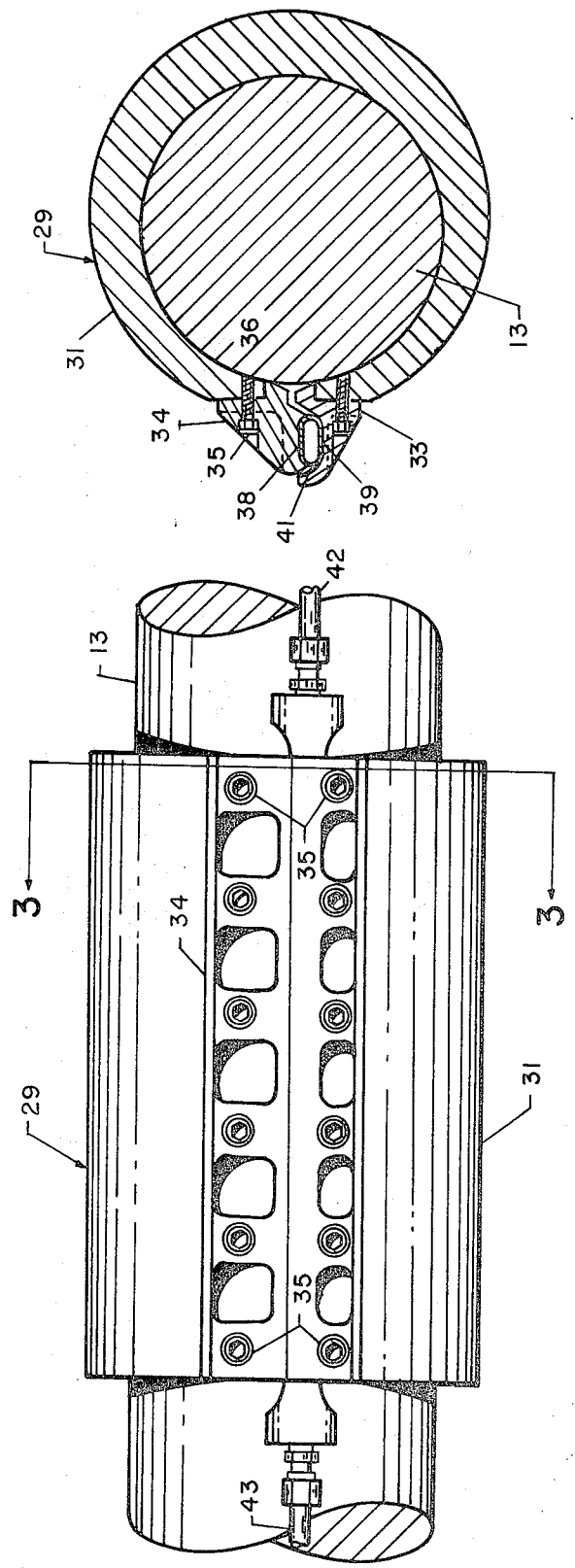

SALVATORE MOTTA
*INVENTOR.*

BY

ATTORNEYS

United States Patent Office 3,552,001
Patented Jan. 5, 1971

3,552,001
METHOD FOR MANUFACTURING A BAND BRAKE
Salvatore Motta, Lowell, Mass., assignor to Avco Corporation, Cincinnati, Ohio, a corporation of Delaware
Original application Feb. 10, 1965, Ser. No. 431,578, now Patent No. 3,362,505. Divided and this application Aug. 15, 1967, Ser. No. 683,742
Int. Cl. B23p 13/04
U.S. Cl. 29—558
3 Claims

ABSTRACT OF THE DISCLOSURE

A method for manufacturing a band brake to be used in applying radial pressure to the outer surface of a movable circular shaft including the steps of providing a slotted annular member, expanding the member to a position and pressure determined by the formula:

$$d = \frac{(f_t)^{3/2}}{1.725E} \times \frac{r}{(p)^{1/2}}$$

and subsequently forming the inner surface of the member.

---

This application is a division of the co-pending application, Ser. No. 431,578, filed Feb. 10, 1965, now Pat. No. 3,362,505, and assigned to the assignee of the present invention.

This invention relates to brake devices, and more particularly to a device for arresting rotational and axial motion of a movable member, at any exact position, relative to the fixed part of the mechanism, and at any given instant.

Many industrial applications provide machines, or components of machines, which have rotational or axial movement, and in addition, require quick braking of this motion. Such components as shafts, cylinders, etc. often have a need for stopping or locking their motion for either functional or safety purposes.

Heretofore, various braking devices have provided arrangements for applying a force at concentrated points on the outer surface of such movable members to obtain the aforementioned result. However, most of these arrangements are quite complex and require large braking forces in operation and therefore, not very efficient.

It is therefore, an object of the present invention to provide a brake device which is efficient, simple in operation and easily manufactured.

Another object of the invention is to provide a brake band for a brake device, which applies a normal force to the exterior of a movable member over a large area.

A further object of the invention is to provide a method of manufacturing a brake band which is both simple and economical to perform.

Yet, another object of the invention is to provide a brake band for applying a force to the outer periphery of a movable member, wherein the application of force is accomplished automatically by releasing from the brake band an unbalanced built in stress.

These objects of the invention, and other objects which will become apparent as the description proceeds, are achieved by providing a brake device having a brake band disposed about the movable member. The brake band is manufactured by a noval method, wherein a stress, imparted to the band during its manufacture, is released to apply pre-determined load normal to the outer surface of the movable member. Means are provided in the braking device for maintaining the brake band in an over-expanded position during movement of the movable member, and for relaxing the brake band allowing it to apply its holding power the instant the movable member is to be arrested.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 2 is an elevational view taken on an enlarged scale showing the invention in detail;

FIG. 3 is a sectional view taken along the lines 3—3 of FIG. 2.

FIGS. 4 through 7 are schmatic views taken on an enlarged scale showing in detail an element of the invention during its manufacture; and FIGS. 8 through 11 are right sectional views taken along the lines 8—8, 9—9, 10—10 and 11—11 of FIGS. 4 through 7 respectively.

Figure 1:
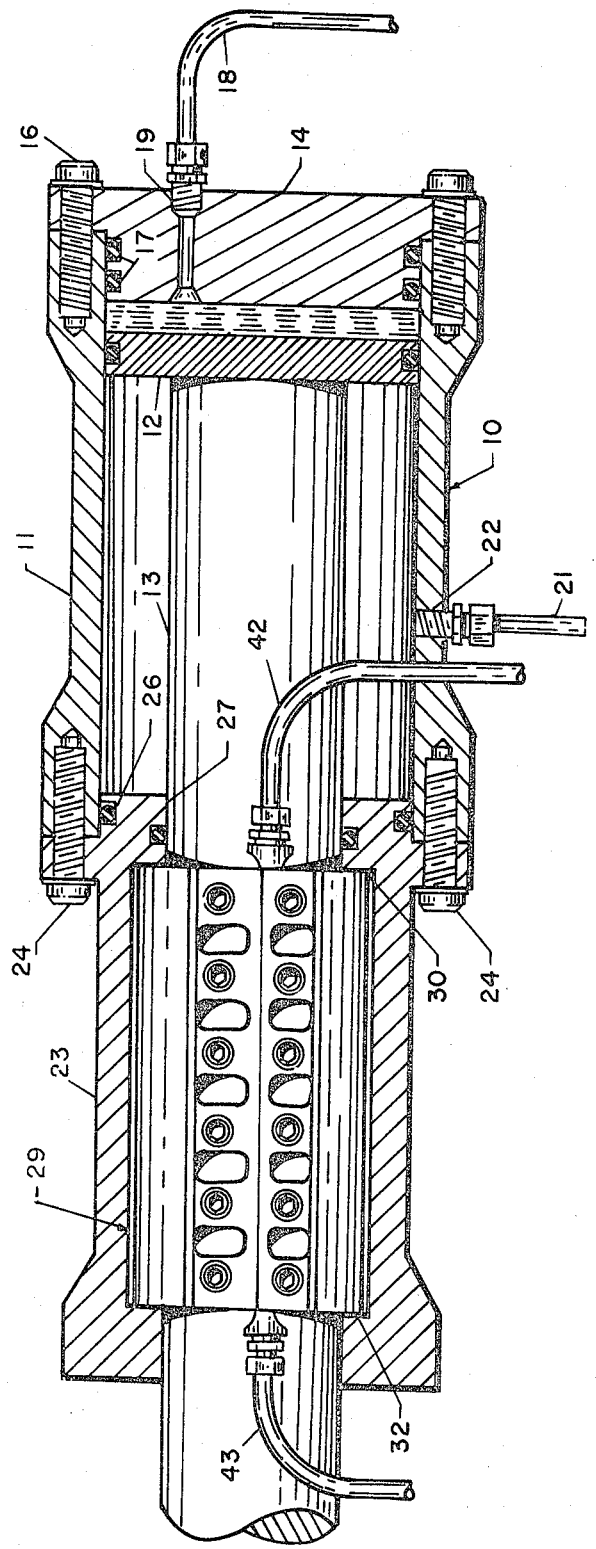
FIG. 1 is an elevational view, partially in section, showing a hydraulic cylinder having an embodiment of the invention employed therein.

Although the principles of the invention are broadly applicable to braking or clamping devices, the invention has been herein illustrated in connection with a hydraulic cylinder arrangement, and will be so described. Referring to the drawings, especially FIG. 1, there is shown a double-acting hydraulic cylinder assembly 10 comprising a cylinder housing 11 in which a piston 12 is disposed. The piston 12 is connected to a shaft 13 and serves to induce linear motion in the shaft. The shaft 13 may be a portion of a simple jack or lifting device, or; may be connected to a complex machine of any known type. The specific machine or device operated by the shaft 13 is not known in detail, as it is not deemed necessary for an explanation of the present invention.

The cylinder housing 11 is provided with an end cap 14 serving to close one end of the housing. The end cap 14 is attached in a suitable manner as by bolts 16 and is provided with a pair of O-rings 17 to maintain a fluid-tight connection between the end cap and the cylinder housing 11.

The piston 12 is moved away from the end cap 14 by providing fluid through a pipe 18 having one end connecting through an opening 19 in the end cap, and the other end thereof connected to a suitable source of fluid pressure such as an hydraulic pump (not shown). A second pipe 21 is attached to an opening 22 in the cylinder housing 11 at a point remote from the end cap 14, and entry of fluid through this second pipe serves to move the piston 12 toward the end cap. Both fluid transfer pipes 18 and 21 may be connected to separate pumps or to a single source of fluid pressure, and controlled by a reversing valve (not shown) of a type well known in the art.

Adjacent the end of the housing 11, opposite the end cap 14, a brake housing 23 is suitably attached as by fasteners such as bolts 24. The housing 23 is provided with a suitable seal such as O-ring 26 at the outer periphery, and a tight fit is provided between the shaft 13 and an inner bearing surface 27. The inner bearing surface 27 also has appropriate sealing members such as O-ring 28 to prevent leakage of fluid between cylinder housing 11 and the brake housing 23.

The brake housing 23 serves to contain a brake assembly 29 which will be described in the following paragraphs in greater detail. The housing 23 has a pair of oppositely facing shoulders 30 and 32 disposed at either end thereof to provide bearing surfaces between the brake assembly 29 and the brake housing 23, when the brake assembly is in engagement with the shaft 13.

For details of the brake assembly 29 reference should be had to FIGS. 2 and 3 wherein the assembly is shown to a brake band 31 having a pair of actuating flanges 33 and 34 fixed to the outer surface thereof by a plurality of fasteners 35. The brake band 31 is manufactured having a C-shaped cross-section and each of the actuating flanges 33 and 34 are disposed in contact with bearing surface 36 and 37 respectively which serve to define a slotted opening extending the length of the band.

As will be noted, especially with reference to FIG. 3, the brake band 31 is of varying thickness cross-section having a maximum thickness at a point diametrically opposite the slotted opening, and a minimum thickness directly adjacent the slotted opening. In addition, the brake band 31 is fabricated such that an initial pre-stress is imparted to the brake band to provide a pre-determined radial pressure when the band is disposed in contact with the shaft 13 as shown in FIG. 3. The specific method of manufacturing the brake band 31 will be described in detail in the following paragraphs.

Referring again to FIGS. 2 and 3, the actuating flanges 33 and 34 are shown disposed in contact with a pair of oppositely facing planar surfaces 38 and 39 of a flattened round tubular member 41. The tubular member 41 is connected at opposite ends to a pair of fluid conduits 42 and 43, which in turn are connected to a suitable source of fluid pressure.

To effect disengagement of the brake band 31 with the shaft 13, the tubular member 41 is pressurized causing the planar surfaces 38 and 39 to bend outwardly. The tubular member 41, therefore, acts as a bladder which tends to assume a circular cross-section when pressurized, thereby forcing the actuating flanges 33 and 34 to separate.

It will be evident to those familiar with the hydraulic art that the conduits 42 and 43 could be so arranged in a hydraulic circuit with the pipes 18 and 21 whereby pressurizing of pipes 18 or 21 would produce a pressure in conduits 42 and 43 suitable to release the band 31. The brake assembly 29 would thereby provide a positive lock for the shaft 13, which is released only on actuation of the shaft in either direction.

CALCULATION OF BRAKE BAND DIMENSION

Basically, the objects of the invention are achieved by storing energy in a curved cantilever beam of variable cross-section, by deflecting it out of its state of equilibrium. Upon release of the deforming load, the beam tends to return to its equilibrium position and will load any second member disposed so as to prevent it from so doing, with a uniformly distributed load.

On the basis of a required, uniformly distributed gripping pressure "$p$" lbs./in.$^2$ for a material with working stress $f_t$ lbs./in.$^2$ the following formula was derived:

$$d = \frac{(f_t)^{3/2}}{1.725 E} \times \frac{r}{(p)^{1/2}}$$

wherein:

$p$=gripping pressure in pounds per square inch necessary, for any given coefficient of friction to obtain the required arresting load on a shaft
$f_t$=the working stress desired in the brake band
$E$=the modulus of elasticity of the material forming the brake band
$r$=½ external diameter of the shaft or the internal diameter of the relaxed brake band, and
$d$=the radial displacement in inches of the brake band from the relaxed position of the expanded position.

From the foregoing, by choosing an appropriate material for the band 31, $f_t$, and $E$ are known. By determining the applied force necessary to brake a specific shaft, such as shaft 13, the applied pressure $p$ and the radius become known. The amount of displacement $d$ may then be readily determined from the above formula, and imparted to the brake band to induce the desired load.

However, to produce a uniform deflection throughout the circumference of the annular member, it is necessary to provide a variable cross-section which in theory conforms to the following derived formula. The annular member is provided with a wall thickness which varies in accordance with the formula:

$$h = \left( \frac{p}{E} \times \frac{24 r^4}{d} \times \sin^2 \frac{a}{2} \right)^{1/3}$$

wherein:

$p$=the applied pressure in pounds per square inch
$E$=the modulus of elasticity of the annular member
$r$=½ the diameter of the annular member
$d$=the radial displacement of the band from the relaxed position to the expanded position
$a$=a point on the annular member measured in degrees from 0° at the slotted opening to 180° at the point of maximum thickness diametrically opposite the opening, and
$h$=the wall thickness in inches measured at any point.

By substituting 180° for $a$ in the above formula, $$\sin^2 \frac{a}{2}$$

reduces to one (1) and the formula for the maximum thickness $h_o$ of the member is:

$$h_o = \left( \frac{p}{E} \times \frac{24 r^4}{d} \right)^{1/3}$$

It should also be noted that at the point where the slotted opening is provided in the annular member, $$\sin^2 \frac{a}{2}$$

becomes 0 and, thus, the theoretical thickness is 0.

It will be obvious that the need for providing a suitable thickness dimension for attaching the actuating flanges 33 and 34 to the brake band 31 dictates that, in actual practice, the formula be strictly applied only to that portion of the band not critical for attachment of the fasteners 35.

In addition, it has been found, that in many instances the formula may be closely approximated by determining the maximum band thickness $h_o$ and manufacturing an annular member having an inner diameter conforming to the shaft 13 when in the stressed position, and an outer diameter suitable to provide the pre-determined maximum thickness dimension $h_o$. In other words, the outer surface of the brake band 31 need not be machined to conform exactly to the theoretical dimension, as a cross-section defining a pair of concentrically machined circles in most cases provides a working member which, in practice, gives a close approximation of a constant radial deflection.

MANUFACTURE OF BRAKE BAND

It has been found that by manufacturing the brake band 31 in a manner such that the cross-section conforms substantially to a curved beam of varying cross-section, and controlling the cross-section according to the aforementioned formulas, a constant deflection occurs at a predetermined radius, which deflection and resultant pressure are substantially equal throughout the circumference of the brake band.

Figure 4:
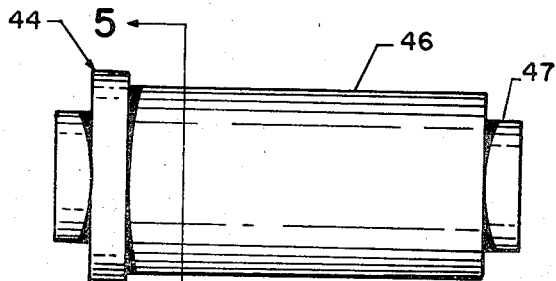
Figure 5:
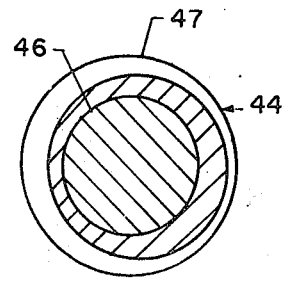
Figure 9:
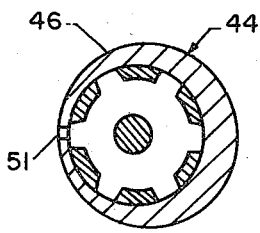

For details of the manufacture of a brake band of the type described, reference should now be had to FIGS. 4 through 11. In FIG. 4 a cylindrical workpiece 44 is shown in the partially machined stage wherein the outer surface 46 has been turned off center by employing an arbor 47 offset between lathe centers. As best shown in FIGS. 5 and 9, the result of the described machining process produces a cylindrical shape having a cross-section of variable thickness, in which a slotted opening 48 is machined to produce a C-shaped member having a slotted opening diametrically opposite the point of maximum thickness.

Figure 6:
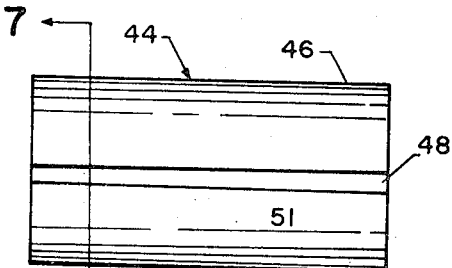
Figure 7:
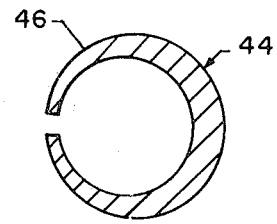
Figure 8:
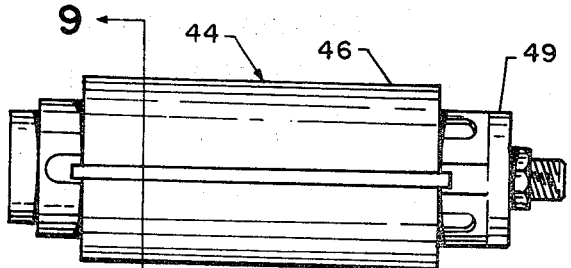
Figure 10:
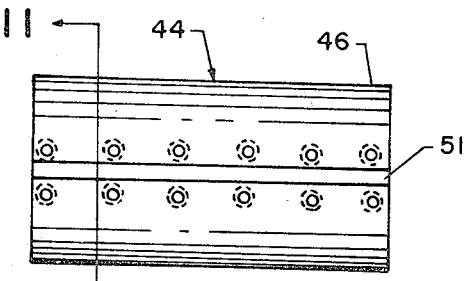
Figure 11:
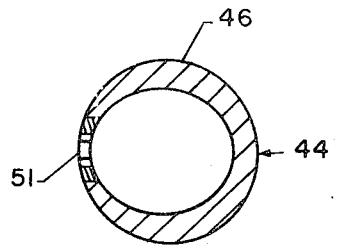

Reference should be had to FIGS. 6 and 10 showing the workpiece 44 having an expandable arbor 49 inserted therein. The arbor 49 is expanded to increase the outside diameter of the workpiece 44 and by the aforementioned pre-determined increment to produce the desired braking load, at which point a spacer 51 is inserted in the slotted opening 48. With the spacer 51 in place and the expanded arbor 49 removed, the inner diameter of the workpiece 44 tends to assume an elongated cross-section as shown in FIG. 11.

The elongated cross-section is converted into a circular cross-section by drilling or machining in a conventional manner an inner surface diameter substantially equal to the outer diameter of the shaft whose motion is to be controlled.

The spacer 51 is then removed. The workpiece contracts to stress relieve itself completing the C-shaped member.

While the invention has been shown in an embodiment wherein linear motion of a movable member is restrained by the brake band 31, it should be obvious that the brake band would be equally effective in restraining rotational movement of a member of similar configuration.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. The method of manufacturing a brake band for application of a radial pressure to the outer circumference of a movable shaft of circular cross-section, comprising the steps of providing an annular member having a slotted opening extending axially the length thereof, and the inner surface of circular cross-section of a smaller diameter than the outer diameter of said shaft, expanding said annular member to a position determined as a function of said pressure to be applied to said movable shaft, the radial displacement $d$ in inches of said band from the relaxed position to said expanded position is determined by the formula:

$$d = \frac{(f_t)^{3/2}}{1.725E} \times \frac{r}{(p)^{1/2}}$$

wherein $p$ = said applied pressure in pounds per square inch
$f_t$ = the working stress of said annular member
$E$ = the modulus of elasticity of said annular member, and
$d$ = the radial displacement in inches, and forming the inner surface of said annular member to a circular cross-section of a diameter substantially equal to said outer diameter of said shaft, while said annular member is in the expanded position.

2. The method of manufacturing a brake band for application of a radial pressure to the outer circumference of a movable shaft of circular cross-section, comprising the steps of providing an annular member having an inner peripheral surface of a diameter substantially equal to the cross-sectional diameter of said movable shaft and an outer peripheral surface of cross-sectional diameter greater than the cross-sectional diameter of said shaft, machining said outer surface of said annular member to form a varying wall thickness between said inner peripheral surface and said outer peripheral surface having a pre-determined maximum thickness, forming a slotted opening in said annular member at a point minimum wall thickness, expanding said annular member to a position determined as a function of said pressure to be applied to said movable shaft, the radial displacement $d$ in inches of said band from the relaxed position to said expanded position is determined by the formula:

$$d = \frac{(f_t)^{3/2}}{1.725E} \times \frac{r}{(p)^{1/2}}$$

wherein $p$ = said applied pressure in pounds per square inch
$f_t$ = the working stress of said annular member
$E$ = the modulus of elasticity of said annular member, and
$d$ = the radial displacement in inches, and forming said inner peripheral surface of said movable member to a cross-sectional diameter substantially equal to the cross-sectional diameter of said movable shaft while said annular member is in the expanded position.

3. The method as set forth in claim 2 in which said step of machining said outer surface of said annular member is characterized by machining said surface to form a maximum wall thickness $h_o$ determined by the formula:

$$h_o = \left(\frac{p}{E} \times \frac{24r^4}{d}\right)^{1/3}$$

wherein $p$ = said applied pressure in pounds per square inch
$E$ = the modulus of elasticity of said annular member
$d$ = the radial displacement in inches of said band from the relaxed position to said expanded position, and
$r$ = ½ said inner diameter of said annular member.

References Cited

UNITED STATES PATENTS

| | | | |
|---|---|---|---|
| 1,542,582 | 6/1925 | Raiche | 29—558 |
| 2,391,724 | 12/1945 | Martin et al. | 188—77 |

JOHN F. CAMPBELL, Primary Examiner

R. J. CRAIG, Assistant Examiner

U.S. Cl. X.R.

29—558; 92—80; 188—77; 192—80